Figure 1:
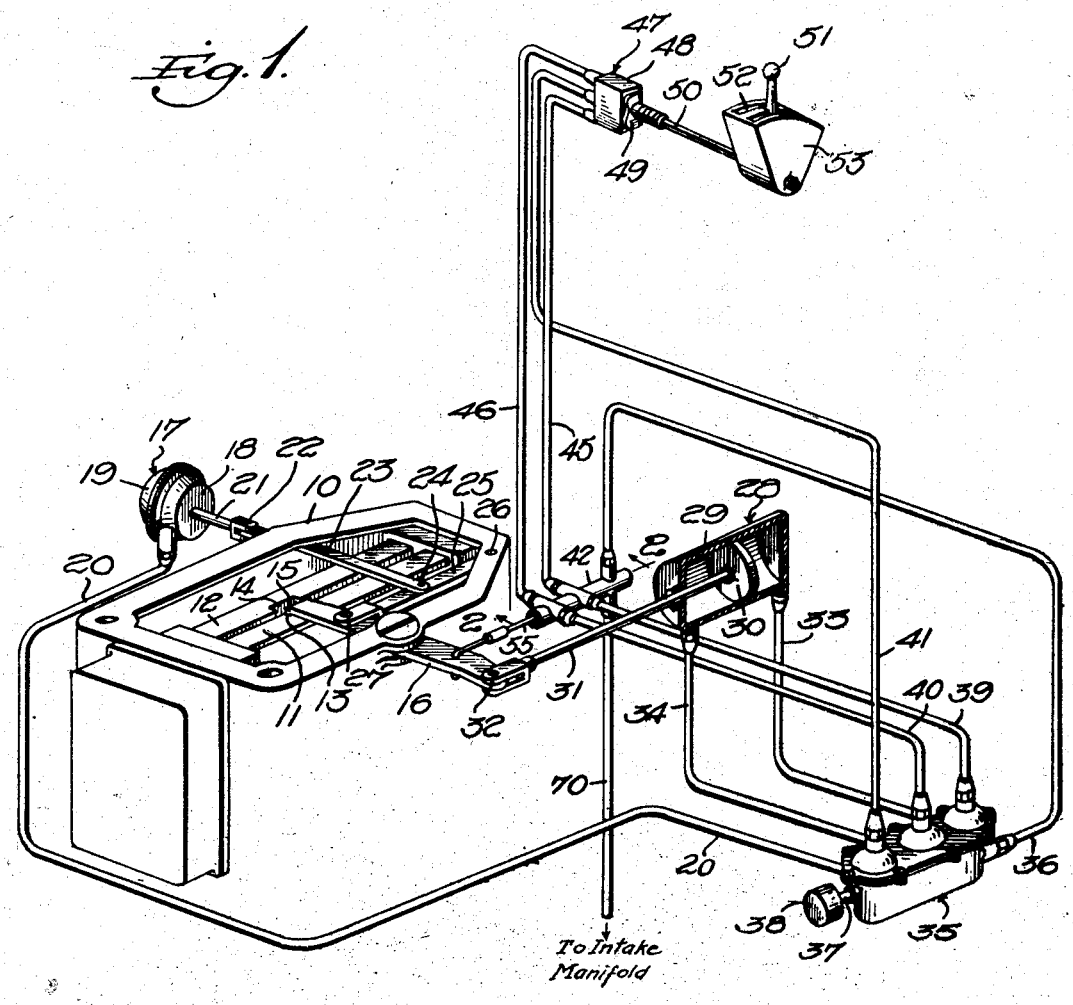

Jan. 23, 1940.   H. W. HEY   2,188,279

GEAR SHIFTING MECHANISM FOR MOTOR VEHICLES

Filed Oct. 1, 1936

To Intake Manifold

Inventor
HENRY W. HEY

Patented Jan. 23, 1940

2,188,279

UNITED STATES PATENT OFFICE 2,188,279

GEAR SHIFTING MECHANISM FOR MOTOR VEHICLES

Henry W. Hey, Richmond, Va., assignor to Automatic Shifters, Inc., Richmond, Va., a corporation of Virginia Application October 1, 1936, Serial No. 103,596

5 Claims. (Cl. 74—334)

This invention relates to gear shifting mechanisms for motor vehicles.

A number of types of fluid pressure devices have been proposed for effecting changes in the gear ratios of motor vehicle transmissions. For example, in the prior patent of Edward G. Hill and Henry W. Hey, No. 2,030,838, granted February 11, 1936, there is disclosed a complete vacuum operated gear shifting mechanism wherein a vacuum motor transmits shifting motion to the selected transmission shift rod, a main valve mechanism being provided for the motor and controlled by a manually operable selector valve mechanism.

In most of the fluid pressure shifting mechanisms of which I am aware, a vacuum or air pressure motor is employed for effecting the shifting action, and such motor is connected to a source of pressure differential to effect the shift from one gear position into another. The motor has uninterrupted connection with the source of pressure differential during the shifting operation with the result that if a rapid shifting action is provided, the gears are caused to clash when meshing. As is well known, it is the conventional practice to retard the manual shifting of the gears when passing through neutral position, in order to permit synchronization of the proper gears prior to the meshing of such gears.

In vehicle transmissions having means for synchronizing the speeds of selected gears, the synchroning means is substantially useless when the gears are shifted by means of a mechanism of the character referred to, since the continuous relatively rapid shifting movement from one gear position to another does not allow sufficient time for the synchronizing means to function. In my copending application Serial No. 93,472, filed July 30, 1936, I have disclosed a fluid pressure operated gear shifting mechanism which is particularly adapted for use with transmissions having synchronizing means, the mechanism being provided with a pressure responsive valve functioning to retard the shifting action upon engagement of the transmission synchronizing means to permit such means to perform its intended function. Such system has been illustrated as being employed in connection with a system of the character disclosed in Patent No. 2,030,838, referred to above, for the reason that such system provides extremely rapid shifting movement out of a gear position, thus permitting the retarding of the shifting movement in the manner stated without unduly delaying the completion of the shifting operation.

An important object of the present invention is to provide a control valve operative for retarding the completion of the shifting operation to permit the synchronization of the selected gears, or of the gear synchronizing means employed in some transmissions, to prevent the gears from clashing upon the completion of the shifting operation.

A further object is to provide a device of the character referred to which is operative in connection with any vehicle transmission, regardless of whether such transmission is provided with gear synchronizing means, but which is particularly adapted for transmissions which are not provided with synchronizing means and wherein the valve mechanism forming the subject matter of my copending application No. 93,472, referred to above, is not applicable.

A further object is to provide a novel automatic control valve which functions to interrupt the maintenance of differential pressure in the shifting motor as the shifting action passes through neutral position, to thereby retard the shifting action and provide the desired relatively short time interval necessary for the selected gears to synchronize their speeds prior to meshing.

Other objects and advantages of the invention will become apparent during the course of the following description.

Figure 2:
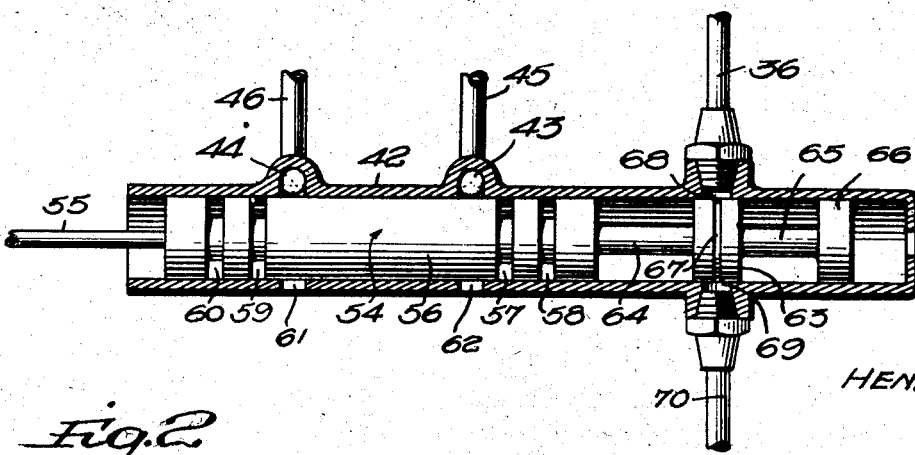

In the drawing I have shown one embodiment of the invention. In this showing:

Figure 1 is a fragmentary perspective view of a portion of a motor vehicle gear set showing the shifting mechanism associated therewith, parts being broken away, and, Figure 2 is a section on line 2—2 of Figure 1.

Referring to Figure 1, the numeral 10 designates a motor vehicle gear set having the cover plate thereof removed for the purpose of illustration. The gear set is provided with the usual gears (not shown) and shifting of the gears is accomplished by transmitting longitudinal movement to either of a pair of shift rods 11 or 12 as will be understood. The perspective view in Figure 1 is taken looking toward the forward end of the vehicle, and in accordance with conventional practice, the shift rod 11 is moved forwardly to provide the usual low gear ratio, and rearwardly for reverse. Similarly, second gear is provided by moving the shift rod 12 rearwardly, while this rod is moved forwardly for high gear.

The shift rods 11 and 12 are respectively provided with notches 13 and 14 selectively engageable by a depending finger 15 formed on the inner end of a horizontal lever 16. This lever projects through the casing of the gear set and is adapted to slide longitudinally to arrange the shifting finger 15 in either of the notches 13 or 14. The desired notch having been selected, the lever 16 is adapted to be swung about a vertical axis, in a manner to be described, to effect the shifting action.

A crossover motor indicated as a whole by the numeral 17 is operative for selecting either of the shift rods for operation. The crossover motor comprises a pair of casings 18 and 19 and corresponds to the crossover motor shown in Patent No. 2,030,838 referred to above. The casing section 19 is in constant communication with the atmosphere, while the casing 18 is adapted to be connected to a source of vacuum through a pipe 20, in a manner to be described. A pressure movable member is arranged in the motor 17 and is connected to an operating stem 21, the motor 17 having a spring (not shown) for biasing the stem 21 toward the left as shown in Figure 1.

The stem 21 is pivotally connected as at 22 to an operating link 23 which slidably extends through the casing of the gear set. The inner end of the link 23 is pivotally connected as at 24 to a lever 25 intermediate the ends of the latter. This lever has one end pivotally connected as at 26 to the casing of the gear set and its other end pivotally connected as at 27 to the lever 16. It will be apparent that the biasing of the stem 21 toward the left as shown in Figure 1 tends to move the lever 16 bodily toward the left to maintain the finger 15 in the notch 14, while energization of the motor 17 is adapted to move the link 23 toward the right to transfer the finger 15 to the notch 13. The lever mechanism for effecting movement of the shift rod forms no part of the present invention per se, and is disclosed and claimed in the copending application of Edward D. Lasley, Serial No. 99,843, filed September 8, 1936.

A shifting motor is employed for operating the lever 16 to actuate the selected shift rod. The shifting motor is indicated as a whole by the numeral 28 and comprises a cylinder 29 having a reciprocating piston 30 therein provided with a piston rod 31 extending through one head of the cylinder 29. The rear end of the piston rod 31 is pivotally connected as at 32 to the outer end of the lever 16, as shown in Figure 1. Pipes 33 and 33 are connected respectively to the forward and rear ends of the cylinder 29, and a suitable valve mechanism is employed for controlling the connection between these pipes and the atmosphere and source of vacuum.

The main valve mechanism for controlling the motors 17 and 28 is indicated as a whole in Figure 1 by the numeral 35. Any suitable form of valve mechanism for controlling the energization of the motors 17 and 28 may be employed, but I prefer to employ a valve mechanism of the type fully disclosed in Patent No. 2,030,838, referred to above. Since the main valve mechanism forms no part per se of the present invention, it need not be illustrated in detail. The valve mechanism is provided with a pipe 36 leading to the source of vacuum in a manner to be described, and an air pipe 37 supplies air to the valve mechanism through a suitable air cleaner 38. The valves (not shown) in the mechanism 35 control the admission of air into the pipes 20, 33 and 34, or the connection of these pipes to the source of vacuum, as will be understood. A pair of pipes 39 and 40 lead to the main valve mechanism and are controlled in a manner to be described to effect operation of the valves which control the connection of the pipes 33 and 34 respectively, to the atmosphere or to the source of vacuum. A third pipe 41 performs a similar function with respect to the valve (not shown) in the mechanism 35, which controls the pipe 20.

Referring to Figures 1 and 2 the numeral 42 designates a tubular valve casing having a pair of transverse passages 43 and 44 to which the pipes 39 and 40 are respectively connected. These passages are likewise connected to a pair of pipes 45 and 46, respectively, and these pipes, together with the pipe 41, lead to a selector valve mechanism indicated as a whole by the numeral 47. The selector valve mechanism comprises a valve housing 48 to which the three pipes 41, 45 and 46 are directly connected, and a valve 49 controls communication between the pipes 45 and 46 and the atmosphere. This valve is carried by a shaft 50 which is adapted to rock to selectively open the pipes 45 and 46 to the atmosphere, and which is adapted to partake of sliding movement to the left as viewed in Figure 1 to open the pipe 41 to the atmosphere.

The shaft 50 is operated by a selector handle 51 movable through an H-slot 52 formed in the upper face of a segmental housing 53. The selector handle 51 partakes of movement corresponding to the movement of a conventional gear shift lever to control the operation of the shifting mechanism, as will be understood. The structure and operations of the selector valve mechanism are fully disclosed in prior Patent No. 2,030,838, referred to above. It is pointed out that in the particular selector and main valve mechanism shown in Figure 1, the admission of air into either of the pipes connected to the selector valve effects actuation of the corresponding valve of the mechanism 35 whereby the latter connects its associated pipe 20, 33 or 34 to the intake manifold through the pipe 36. Conversely, each of the valves of the mechanism 35 connects its associated pipe 20, 33 or 34 to the atmosphere through the pipe 37 when the associated pipe 41, 45 or 46 is closed to the atmosphere.

From the foregoing it will be apparent that the selector handle 51 is movable to selected operative positions to connect one end of the cylinder 29 to the atmosphere and the other end to the intake manifold to effect movement of the piston 30 toward one end of the cylinder, and thus effect movement of one of the shift rods 11 or 12 to a gear position. When such position is reached, the end of the cylinder 29 which was previously connected to the atmosphere is automatically connected to the intake manifold to "vacuum suspend" the piston 30 and for this purpose a valve indicated as a whole by the numeral 54 is slidable in the valve casing 42. This valve has one end connected by a link 55 to the lever 16 to be actuated thereby when a shifting operation takes place. The valve 54 is provided with a central relatively long land 56 and the ends of the valve are provided respectively with pairs of grooves 57 and 58, and 59 and 60.

In the operation of the apparatus, the admission of air into the pipe 45 connects the forward end of the cylinder 29 to the source of vacuum while the rear end of the cylinder 29 remains connected to the atmosphere, and accordingly the piston 30 will move forwardly. This action transmits a shifting motion to the selected shift rod, the outer end of the lever 16 swinging forwardly during such operation. When the desired gear position is reached either of the grooves 59 or 60 will communicate with the passage 44, and the bottom of the valve casing 42 is provided with an opening 61 which connects the passage 44 to the atmosphere under such conditions, thus admitting air into the pipe 40 to effect actuation of the associated valve and connect the rear end of the cylinder 29 to the source of vacuum.

Similarly, the admission of air into the pipe 46 by operation of the selector valve 49 admits air into the pipe 40 to effect actuation of the associated valve and thus connect the rear end of the cylinder 29 to the intake manifold. The piston 30, under such conditions, will move rearwardly to effect the shifting action, and similar movement will be transmitted to the valve 54. When the desired gear position is reached, either of the grooves 57 or 58 will communicate with the passage 43, and the bottom of the valve casing 42 is provided with an opening 62 through which air is admitted into the passage 43 under such conditions. The forward end of the cylinder 29 will then be connected to the source of vacuum, and the piston 30 will be "vacuum suspended" in the selected gear position.

The valve 54, in itself, forms no part of the present invention, and forms the subject matter of my copending application Serial No. 104,139, filed October 5, 1936. This valve is shown in the present instance because of its connection with an auxiliary control valve to be described.

Referring to Figures 1 and 2 it will be noted that the valve housing 42 is elongated a substantial distance forwardly of the valve 54. A valve 63 is slidable in such elongated portion of the valve casing 42 and is connected by a stem 64 to the adjacent end of the valve 54. The other side of the valve 63 is connected by a stem 65 to a head 66. The valve 63 is preferably provided with an annular groove 67 for a purpose to be described.

The extended portion of the valve casing 42 is provided with a pair of circumferentially spaced ports 68 and 69, the former of which is connected to the vacuum pipe 36, although it will become apparent that the valve 63 is operative for the desired purpose if connected in the air pipe 37. When the device is connected in the vacuum pipe 36, the port 69 is connected to one end of a pipe 70 leading to a source of vacuum, such as the intake manifold.

The operation of the apparatus is as follows:
The functioning of the valve 63 is not dependent upon its use with any particular type of main valve mechanism, selector valve mechanism or any particular type of crossover and shifting motors. Accordingly it has been considered unnecessary to specifically illustrate all of the parts of the shifting apparatus. It will be understood that when the selector handle 51 is moved to the left and rearwardly, the selector valve and main valve mechanism function to place the gear set in low gear. The operation of the selector handle in the manner referred to slides the shaft 50 longitudinally and opens the pipe 41 to the atmosphere, thus resulting in the energization of the crossover motor to slide the link 23 to the right as viewed in Figure 1, thus placing the shifting finger 15 in the notch 13.

The rocking of the selector valve 49, incident to the movement of the handle 51, opens the pipe 46 to the atmosphere, thus resulting in the connection of the rear end of the cylinder 29 to the intake manifold while maintaining connection between the forward end of the cylinder 29 and the atmosphere. Thus the piston 30 is moved rearwardly to effect forward movement of the shift rod 11. This operation places the gear set in low gear as will be apparent. In a similar manner, the handle 51 may be moved to the left and forwardly to place the vehicle in reverse; it may be moved to the right and forwardly for second gear; and it may be moved to the right and rearwardly for high gear. The crossover and shifting motors will be properly controlled to provide the shift into any desired gear position. When any gear position is reached, the piston 30 will be vacuum suspended in the cylinder 29 by the admission of air into the passage 43 through one of the grooves 57 or 58, or into the passage 44 through one of the grooves 59 or 60. The pair of grooves in each end of the valve 49 is provided to adapt the apparatus for use in connection with transmissions in which the shift rods move different distances as, for example, in transmissions having synchronizing means associated with second and high gears. Only one groove need be provided in each end of the valve 54 for "square" transmissions, that is, transmissions in which each movement of each shift rod takes place to an equal extent, as will be apparent.

The valve 63 is particularly intended for use in transmissions in which no synchronizing means are provided in the gear set, but it is equally applicable for use with transmissions of the type just referred to. The purpose of the valve 63 is to effect a pausing or retarding of the shifting movement when passing approximately neutral position between any two gear positions to permit the synchronizing of the selected gears or to permit the proper functioning of gear synchronizing means in the transmission.

The valves 54 and 63 occupy the position shown in Figure 2 when the gears are in neutral position, and obviously these valves pass through such position when the parts of the gear set reach neutral position during any shifting operation. The valve 63 is without function when the gear set is placed in neutral position by moving the handle 51 to such position. Under such conditions, the valve 49 will move to the position shown in Figure 1 closing both pipes 45 and 46 to the atmosphere, and when the gear set reaches neutral position, the valve 54 will assume the position shown in Figure 2, thus closing both passages 43 and 44 to the atmosphere. Under such conditions the gear set will stop in neutral position, as fully disclosed in prior Patent No. 2,030,838, referred to above. However, when shifting from one gear position to another, the energization of the motor 28 tends to move the piston 30 continuously from a point adjacent one end of the cylinder 29 to a point adjacent the other end of the cylinder, and the piston movement is extremely rapid in the system of the patent referred to, due to the vacuum suspension of the piston 30 in either of its gear positions. If this rapid movement of the piston is permitted to take place throughout its stroke, it will be apparent that no time will be permitted for gear synchronization, and clashing of the gears will result. Likewise, in transmissions having synchronizing means associated with at least certain of the gears, such synchronizing means would not be permitted to properly function, due to the rapid movement of the parts from one gear position to another.

Under the conditions referred to, the valve 63 functions automatically to provide a pausing or retarding of the shifting operation when passing through neutral position, thus providing a short interval of time in which synchronization can take place. It will be apparent that the continuous movement of the piston from one end of the cylinder to the other depends upon the continuous admission of air into one end of the cylinder 29 and the continuous exhaustion of air from the other end of the cylinder. With the present construction, the valve 63, being actuated in the same manner as the valve 54, will assume the position shown in Figure 2 when the shifting operation reaches neutral position, and thus substantial communication between the pipes 36 and 70 will be interrupted. The valve groove 67 is of relatively small cross-sectional area, and this groove accordingly operates to restrict the exhaustion of air from the end of the cylinder 29 which is connected to the intake manifold, and accordingly movement of the piston 30 will be substantially retarded when passing through a position corresponding to neutral position.

Motion of the piston 30 up to this point will be quite rapid, but the retarding of the movement of the piston provides the necessary time element required for synchronization of the gear parts, and when the valve head 63 passes beyond the ports 68 and 69, the normal speed of operation of the parts will be resumed since the normal unrestricted communication between the pipes 36 and 70 will be restored.

Accordingly it will be apparent that when a shift is made between any two gear positions, the movement of the parts will be retarded at neutral position, thus preventing any clashing of the gears in a transmission not provided with synchronizing means. Where a transmission is provided with synchronizing means, such means is afforded the necessary time in which to properly function. The length of the valve 63 and the cross-sectional area of the groove 67 will depend upon the particular transmission in connection with which the apparatus is employed, as will be apparent, and accordingly any desired retarding action of the shifting movement may be provided. The valve 63 is particularly adapted for use with a mechanism of the type disclosed in Patent No. 2,030,838, previously referred to, in view of the extremely rapid shifting operation which such system makes possible. Therefore, the momentary retarding of the shifting operation in neutral position does not materially delay the completion of any shifting operation, and each shifting operation is carried out in a manner closely simulating conventional practice.

It will be apparent that the valve 63 need not be connected for operation in the manner shown, and may be actuated by any part of the apparatus to move in accordance with the shifting operation. The connection of the valve 63 to the valve 64 eliminates the necessity for a separate actuating device for the valve 63. Moreover, this construction permits the valve 63 to be made integral with the valve 54, and permits the use of a single valve casing 42 for the two valves referred to.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a transmission having a member movable in opposite directions from neutral position to provide different transmission ratios, comprising a single power device for actuating said member, means separate from said power device for retarding the speed of movement of said member, and mechanically operated means operative upon movement of said member for rendering said last named means operative approximately in the neutral position of said member when the latter is moving in either direction.

2. A gear shifting mechanism for a transmission having a member movable in opposite directions from neutral position to provide different transmission ratios comprising a single differential fluid pressure motor for actuating said member, control valve means for said motor, and mechanically operated means separate from said motor and operative upon movement of said member approximately at the neutral position of said member for retarding the speed of movement thereof in either direction.

3. A gear shifting mechanism for a transmission having a member movable in opposite directions from neutral position to provide different transmission ratios, comprising a single differential fluid pressure motor for actuating said member, control valve means for said motor, mechanically operated means separate from said motor for retarding the speed of movement of said member, and means for rendering said last named means operative approximately at the neutral position of said member in either direction of movement thereof.

4. A gear shifting mechanism for a transmission having a member normally positioned in neutral position and movable in opposite directions therefrom into different transmission setting positions, comprising a single differential fluid pressure motor having a piston connected to actuate said member in either direction, a pair of sources of fluid at different pressures, control valve means for connecting said motor on opposite sides of said piston to the respective pressure sources, and single means for reducing connection of one end of said motor with its pressure source during a predetermined portion of the travel of said piston in either direction.

5. A gear shifting mechanism for a transmission having a member movable in opposite directions from a neutral position into different transmission setting positions, comprising a single differential fluid pressure motor having a piston connected to actuate said member in either direction, a pair of sources of fluid at differential pressures, a control valve mechanism for selectively connecting said motor on opposite sides of said piston to the respective pressure sources, a cylindrical valve casing having a pair of ports which, when in communication with each other, connect said valve mechanism to one of said sources, and a valve slidable in said casing and connected to be operated upon movement of said piston in either direction, said valve, when said movable member is approximately in neutral position, partially restricting communication between said ports.

HENRY W. HEY.